United States Patent
Kim et al.

(10) Patent No.: US 11,775,965 B2
(45) Date of Patent: Oct. 3, 2023

(54) SERVICE PROVIDING METHOD PERFORMED BY SERVER OF MUSIC PLATFORM USING BLOCKCHAIN-BASED NFT

(71) Applicant: Han Jo Kim, Incheon (KR)

(72) Inventors: Han Jo Kim, Incheon (KR); Tae won Kim, Uijeongbu-si (KR)

(73) Assignee: Han Jo Kim, Incheon (KR)

( * ) Notice: Subject to any disclaimer, the term of this patent is extended or adjusted under 35 U.S.C. 154(b) by 0 days.

(21) Appl. No.: 17/869,790

(22) Filed: Jul. 21, 2022

(65) Prior Publication Data

US 2023/0071913 A1 Mar. 9, 2023

Related U.S. Application Data

(63) Continuation of application No. PCT/KR2022/006083, filed on Apr. 28, 2022.

(30) Foreign Application Priority Data

Sep. 2, 2021 (KR) .......................... 10-2021-0117225

(51) Int. Cl.
*G06Q 20/36* (2012.01)
*H04L 9/32* (2006.01)
*H04L 9/00* (2022.01)

(52) U.S. Cl.
CPC ....... *G06Q 20/3678* (2013.01); *H04L 9/3213* (2013.01); *H04L 9/50* (2022.05); *G06Q 2220/16* (2013.01); *H04L 2209/605* (2013.01)

(58) Field of Classification Search
CPC ............ G06Q 20/3678; G06Q 2220/16; H04L 9/3213; H04L 9/50; H04L 2209/605
See application file for complete search history.

(56) References Cited

U.S. PATENT DOCUMENTS

| | | | |
|---|---|---|---|
| 11,075,891 B1 * | 7/2021 | Long | .................. G06F 21/10 |
| 2010/0208631 A1 * | 8/2010 | Zhang | .................. H04R 25/70 |
| | | | 370/297 |

(Continued)

FOREIGN PATENT DOCUMENTS

| | | |
|---|---|---|
| KR | 10-2010-0052022 A | 5/2010 |
| KR | 10-1041279 B1 | 6/2011 |

(Continued)

OTHER PUBLICATIONS

Kim, Young-mo, "A Study on The Feasibility of Copyright Protection and Distribution Technology based on Blockchain" Korea Cultural Contents Technology Association, Dec. 10, 2019.

*Primary Examiner* — Neha Patel
*Assistant Examiner* — Chunling Ding
(74) *Attorney, Agent, or Firm* — Nicholas Park

(57) ABSTRACT

A service providing method of the present invention includes receiving sound source information on a sound source to be registered to the music platform and issuing a blockchain-based NFT that represents an ownership for the sound source; receiving a request for using a service related to the sound source registered to the music platform from at least one at least one service use terminal connected to the blockchain-based network; and in response to the received request, providing a service related to the sound source based on the blockchain-based NFT issued in advance for the sound source to the at least one service use terminal.

1 Claim, 9 Drawing Sheets

(56) References Cited

U.S. PATENT DOCUMENTS

| | | | | |
|---|---|---|---|---|
| 2020/0005284 A1* | 1/2020 | Vijayan | .................. | H04L 63/08 |
| 2020/0052917 A1* | 2/2020 | Corral | ................ | G06Q 20/0655 |
| 2021/0248214 A1* | 8/2021 | Goldston | .............. | G06F 16/686 |
| 2021/0271738 A1* | 9/2021 | Hatcher | .................. | G06F 21/16 |
| 2021/0365909 A1* | 11/2021 | Shiina | .................. | G06Q 20/381 |
| 2022/0318938 A1* | 10/2022 | Ogawa | ................ | G06Q 50/184 |
| 2022/0327225 A1* | 10/2022 | Lyren | .................... | H04L 9/0643 |
| 2022/0337392 A1* | 10/2022 | Schauer | ............... | H04L 9/3247 |
| 2022/0358450 A1* | 11/2022 | Stephens | .............. | H04L 9/3213 |

FOREIGN PATENT DOCUMENTS

| | | | | |
|---|---|---|---|---|
| KR | 10-2020-0021853 A | 3/2020 | | |
| KR | 10-2021-0059589 A | 5/2021 | | |
| KR | 10-2021-0076665 A | 6/2021 | | |
| KR | 10-2021-0079984 A | 6/2021 | | |
| KR | 10-2021-0105362 A | 8/2021 | | |
| KR | 10-2294571 B1 | 8/2021 | | |
| WO | WO-2012166937 A3 * | 2/2013 | ............. | G06F 21/10 |

\* cited by examiner

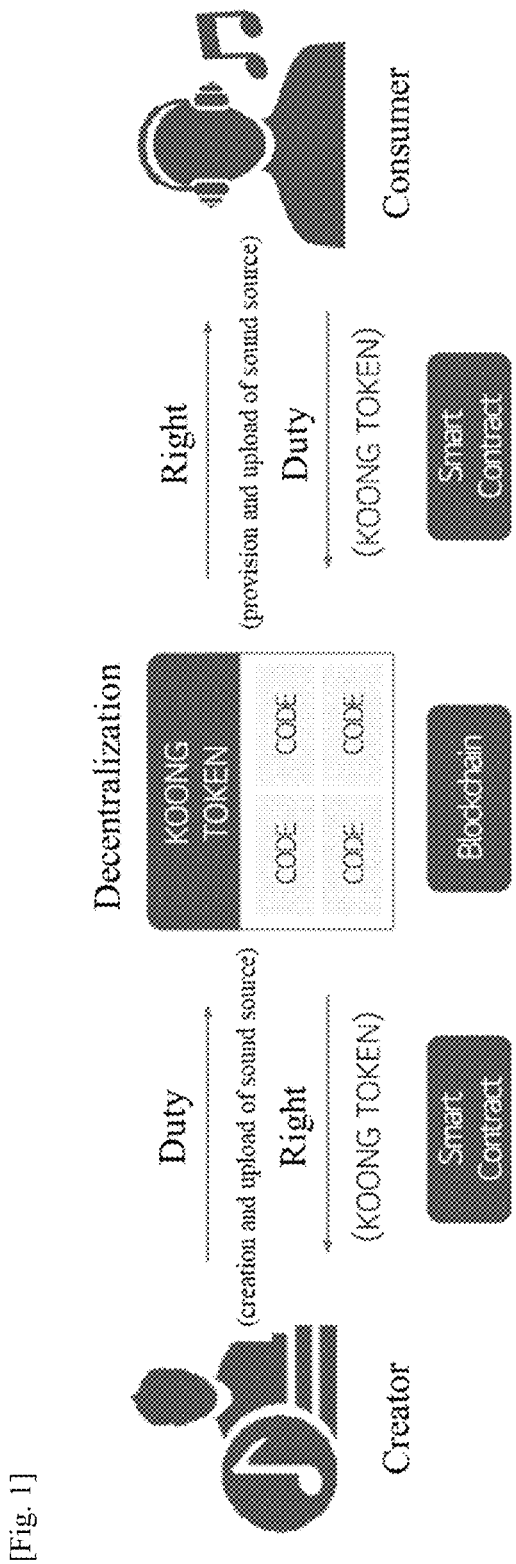
[Fig. 1]

[Fig. 2]
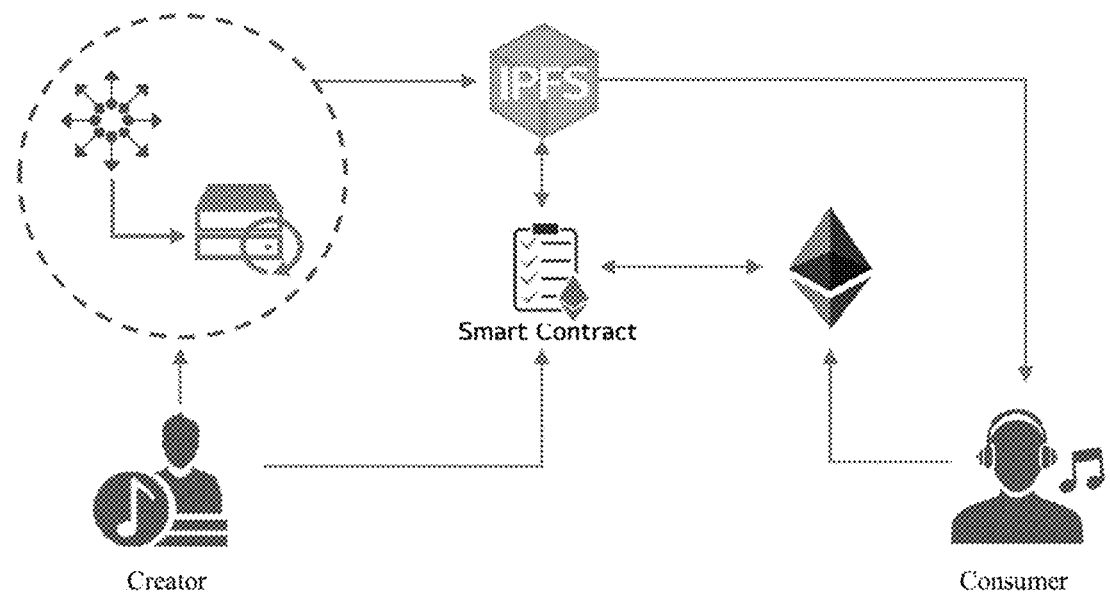
[Fig. 3]
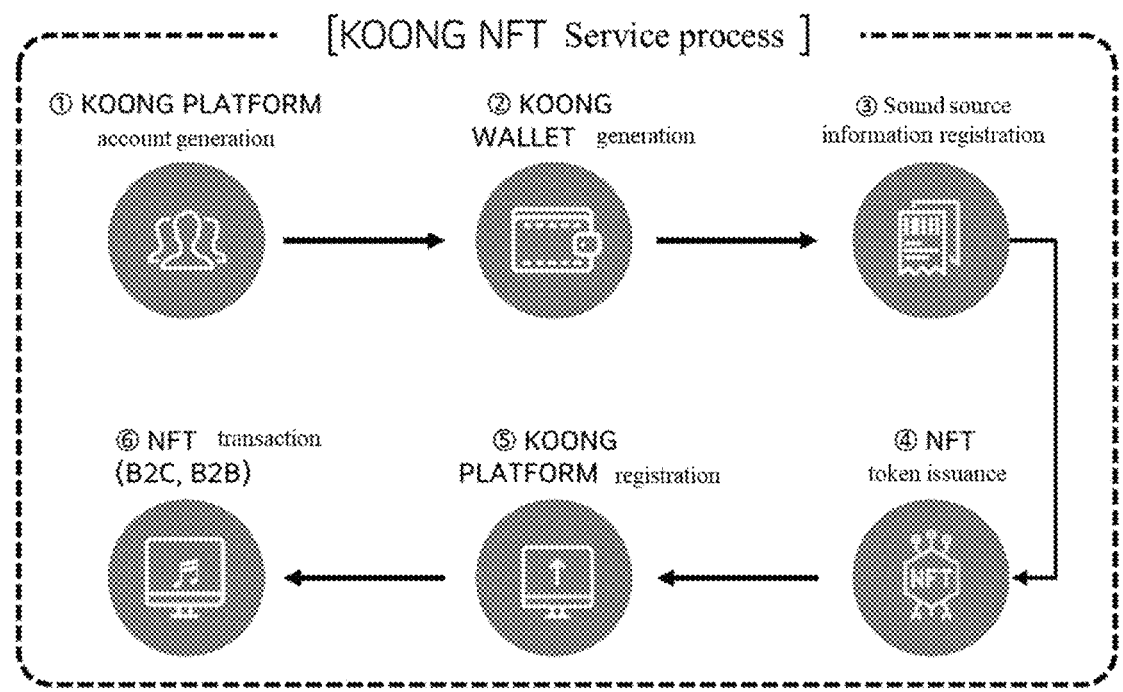

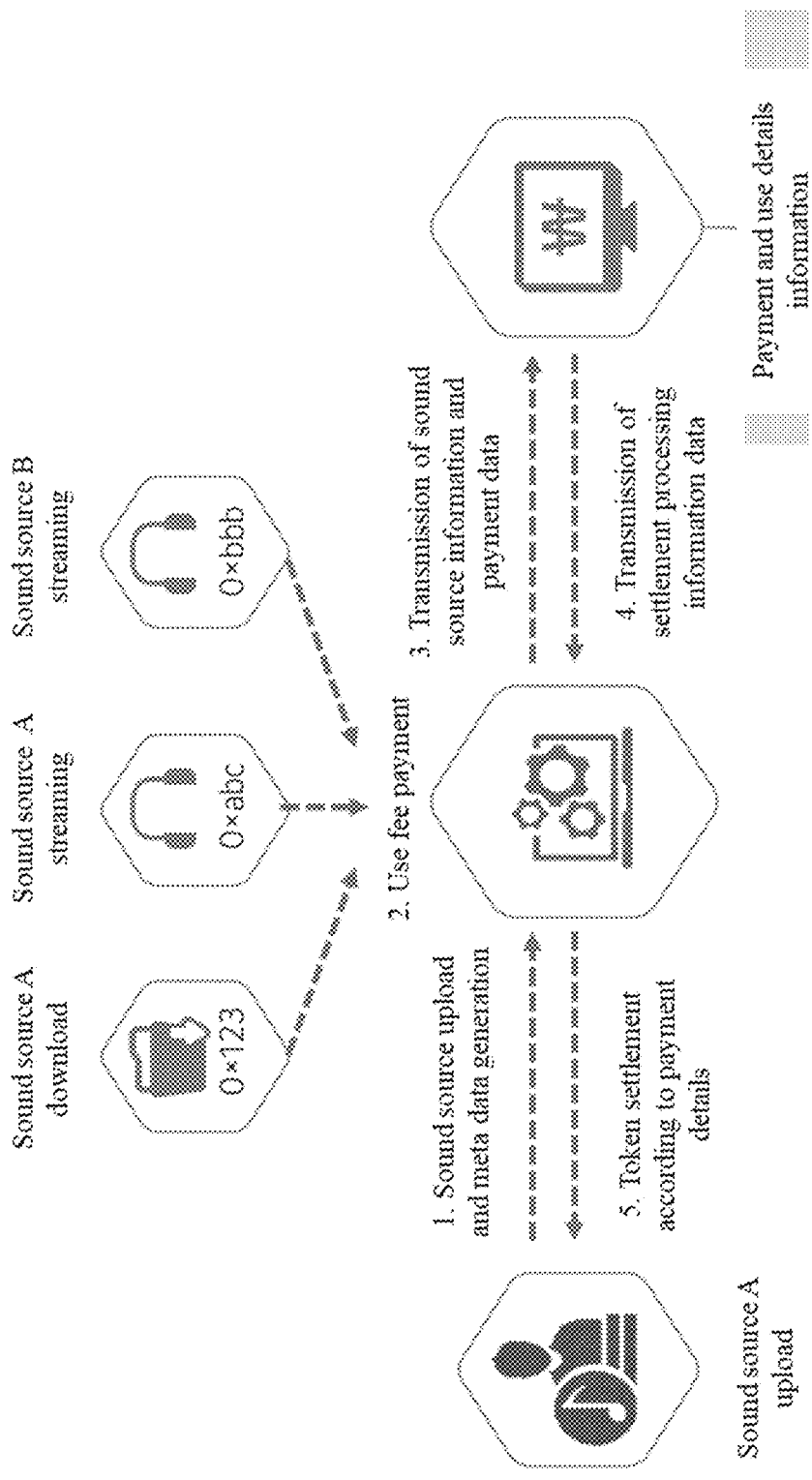
[Fig. 4]

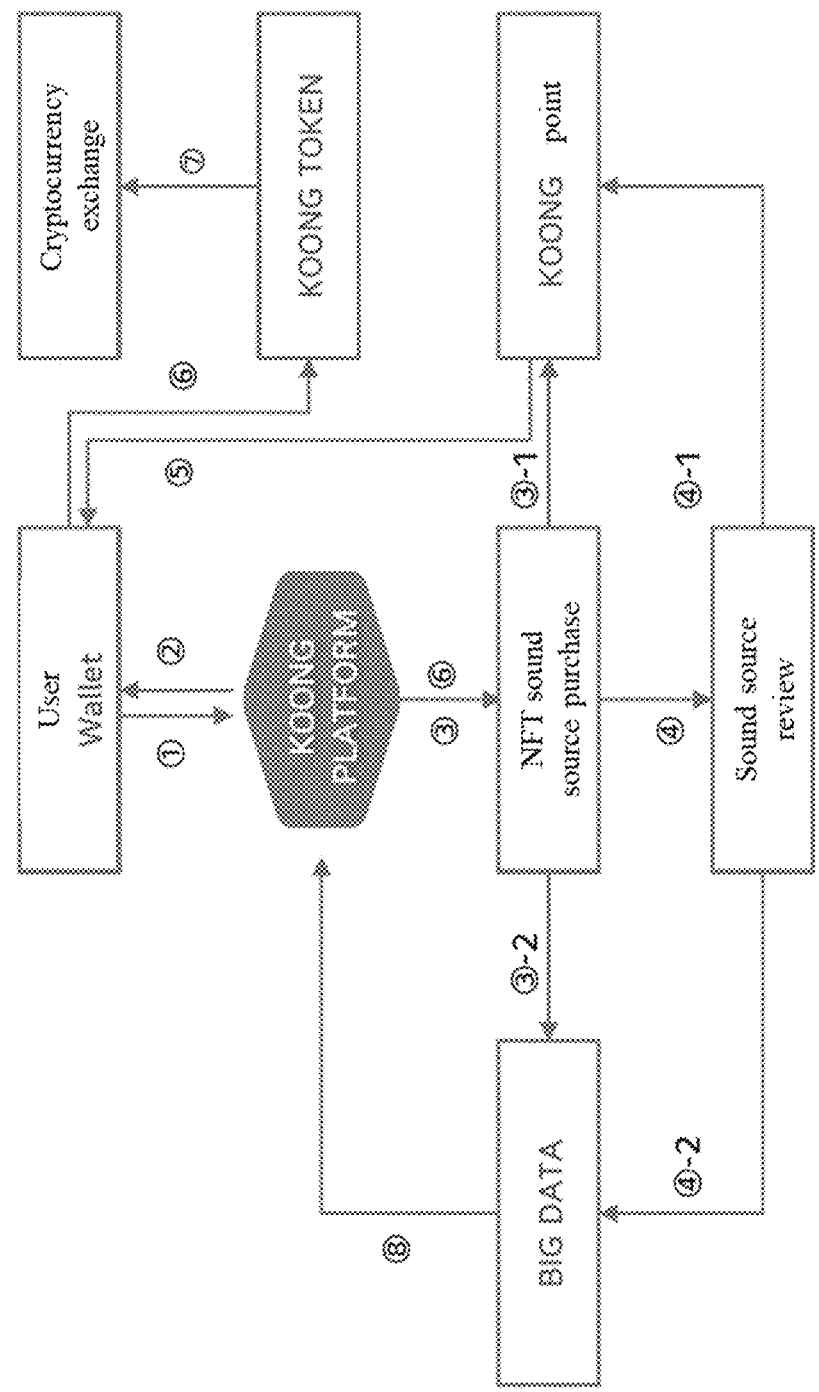
[Fig. 5]

[Fig. 6]
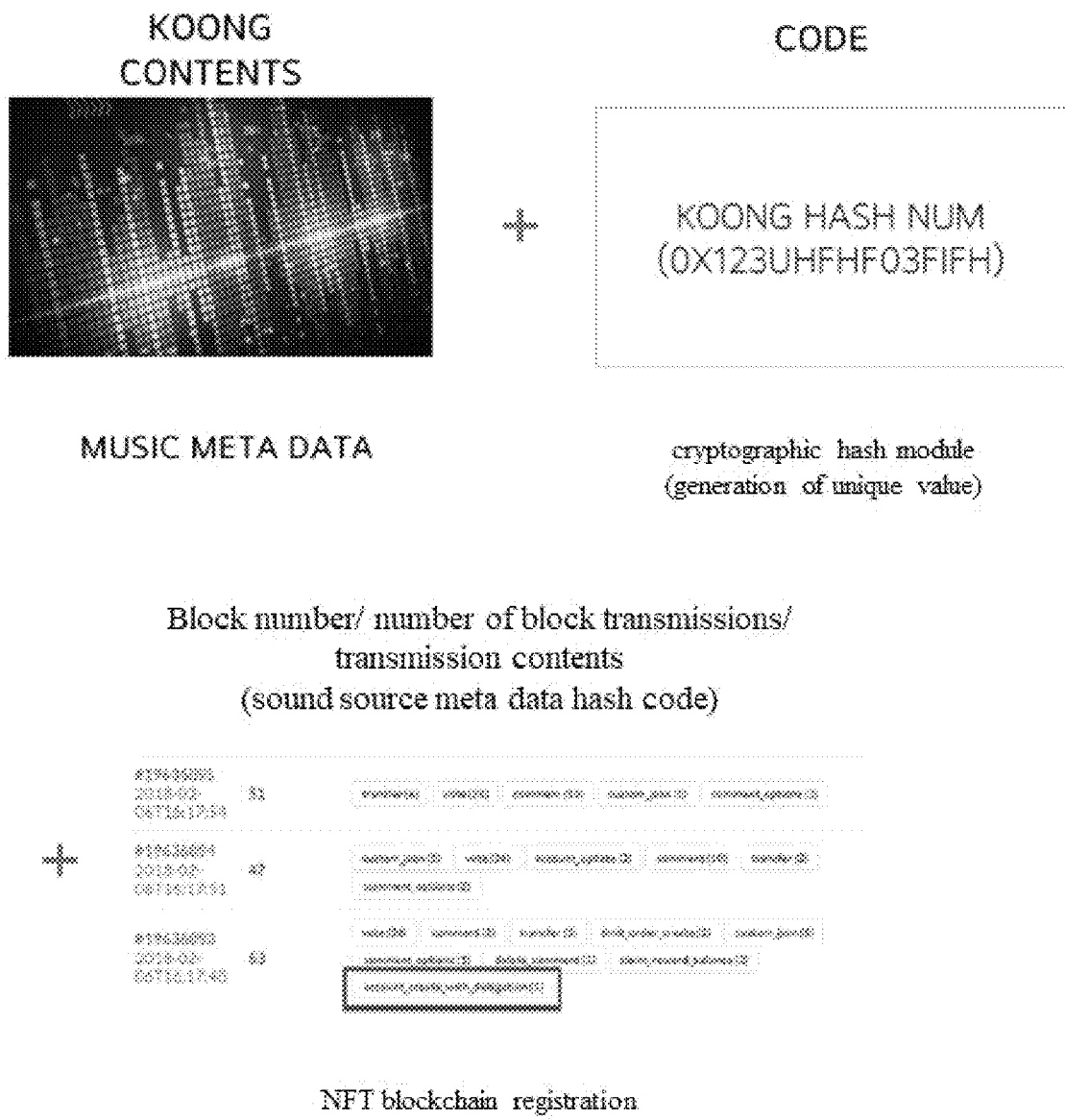

[Fig. 7]
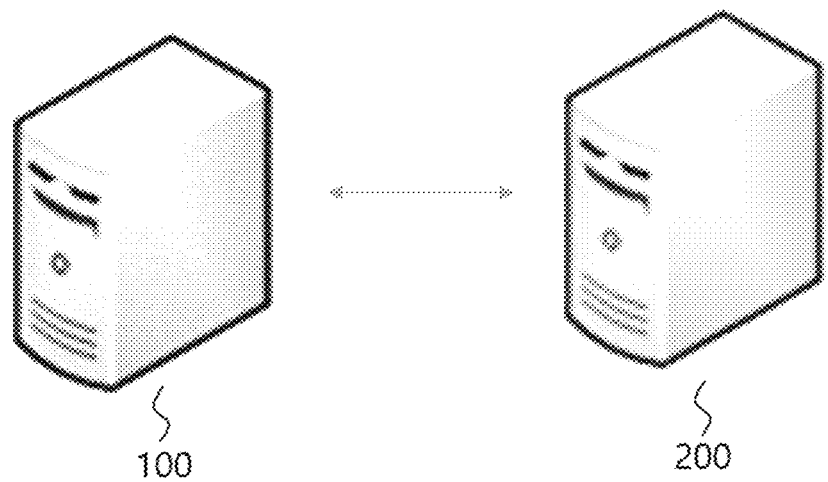
[Fig. 8]
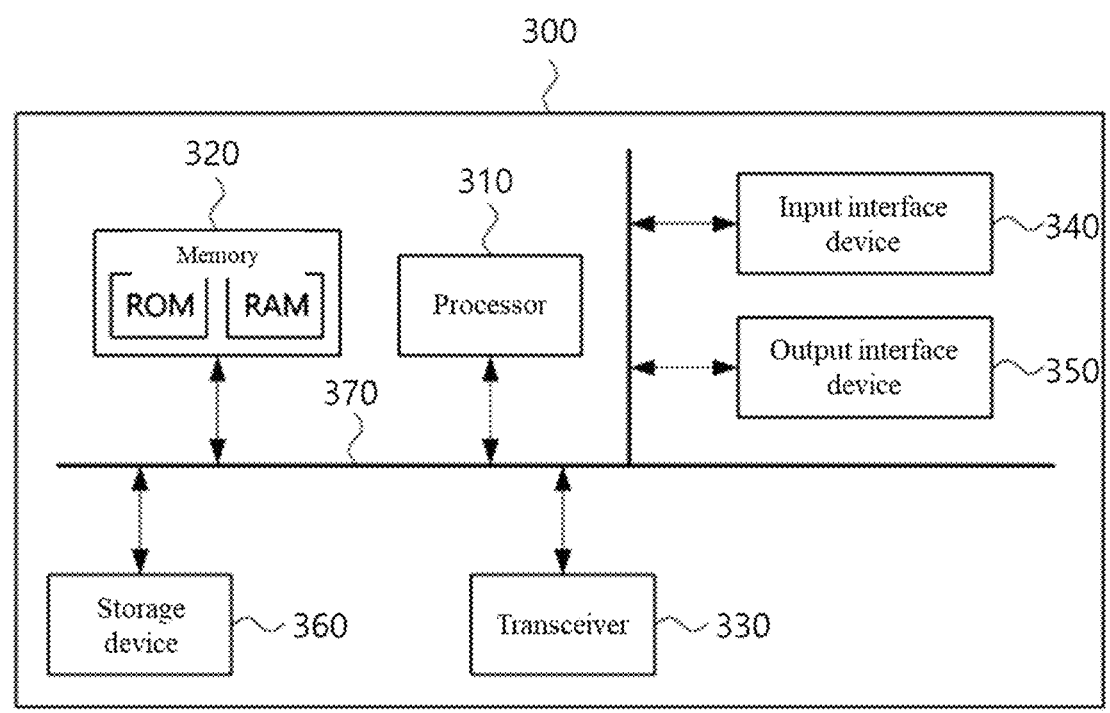

[Fig. 9]
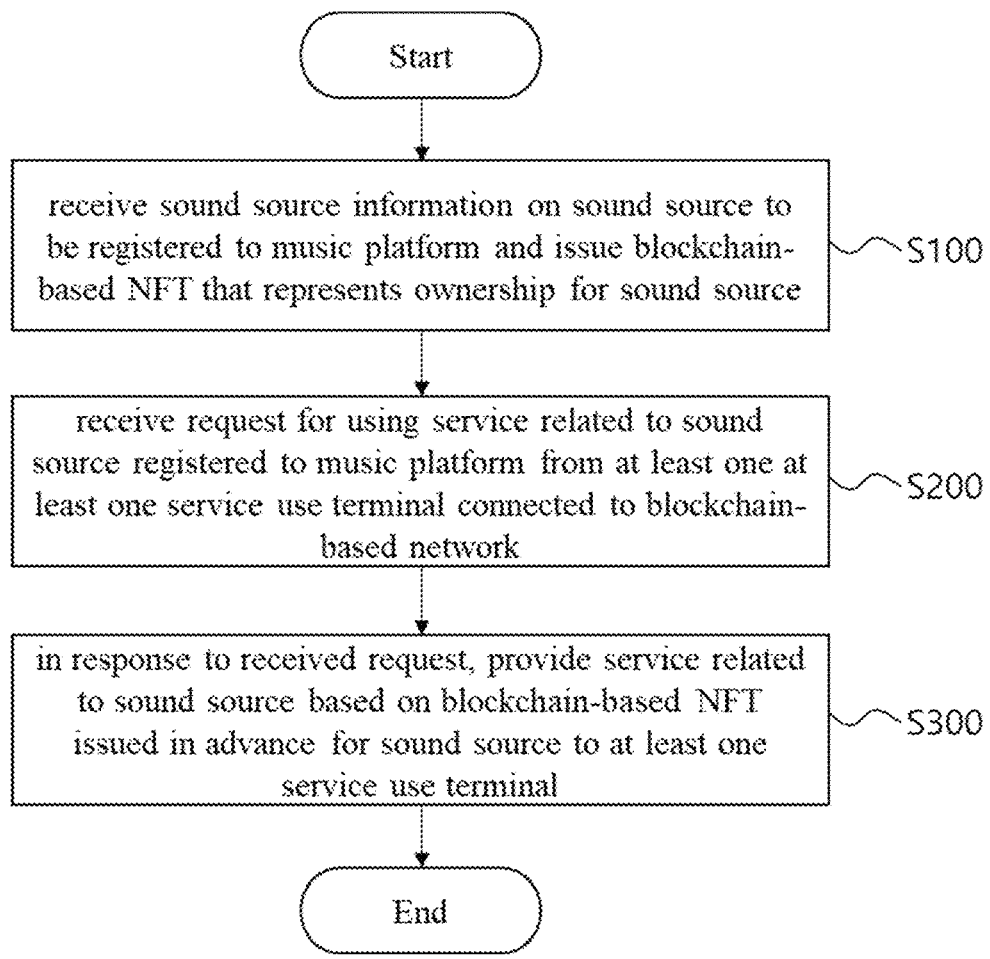

[Fig. 10]
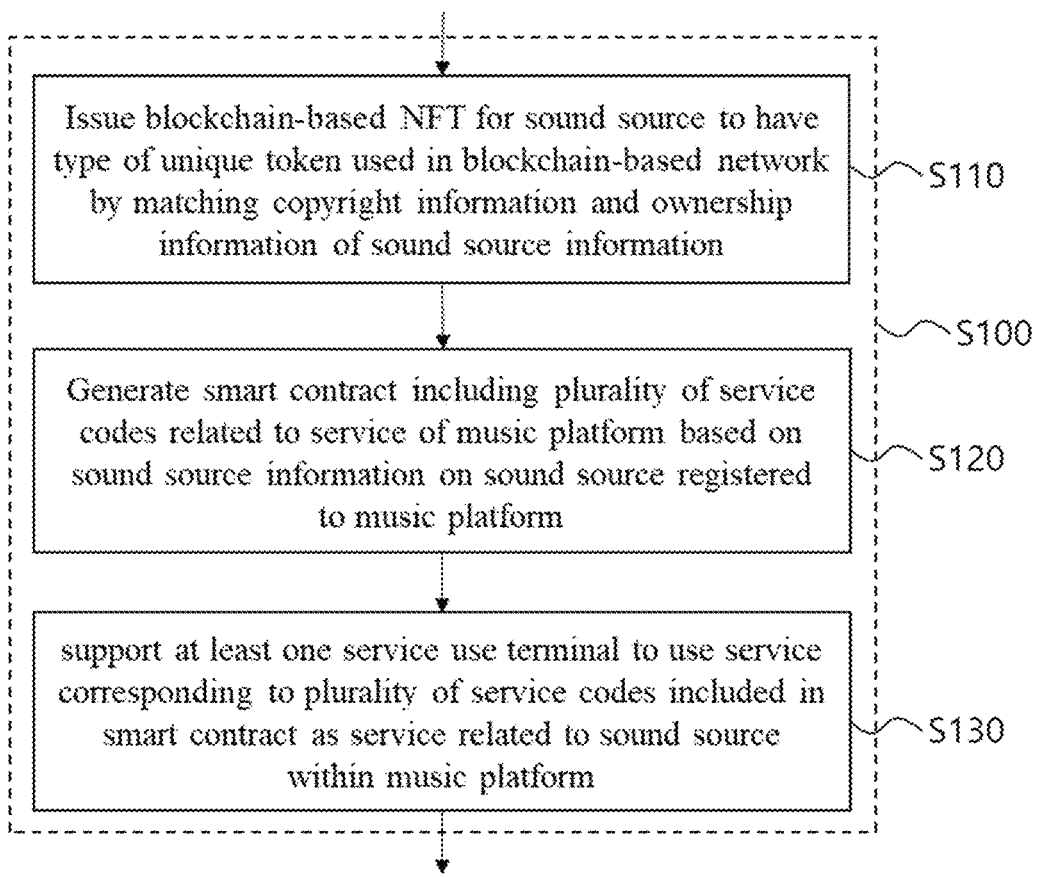

[Fig. 11]
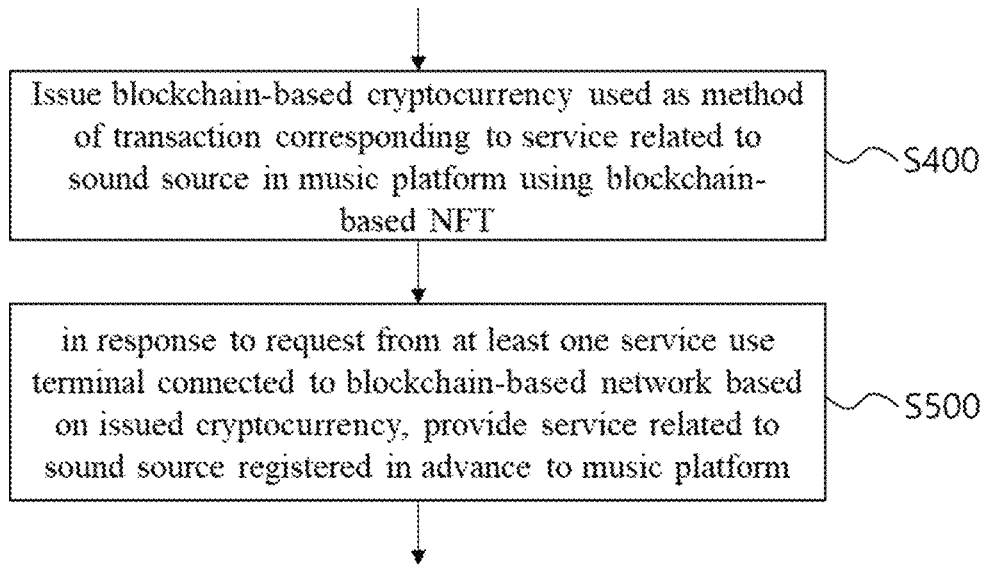
[Fig. 12]
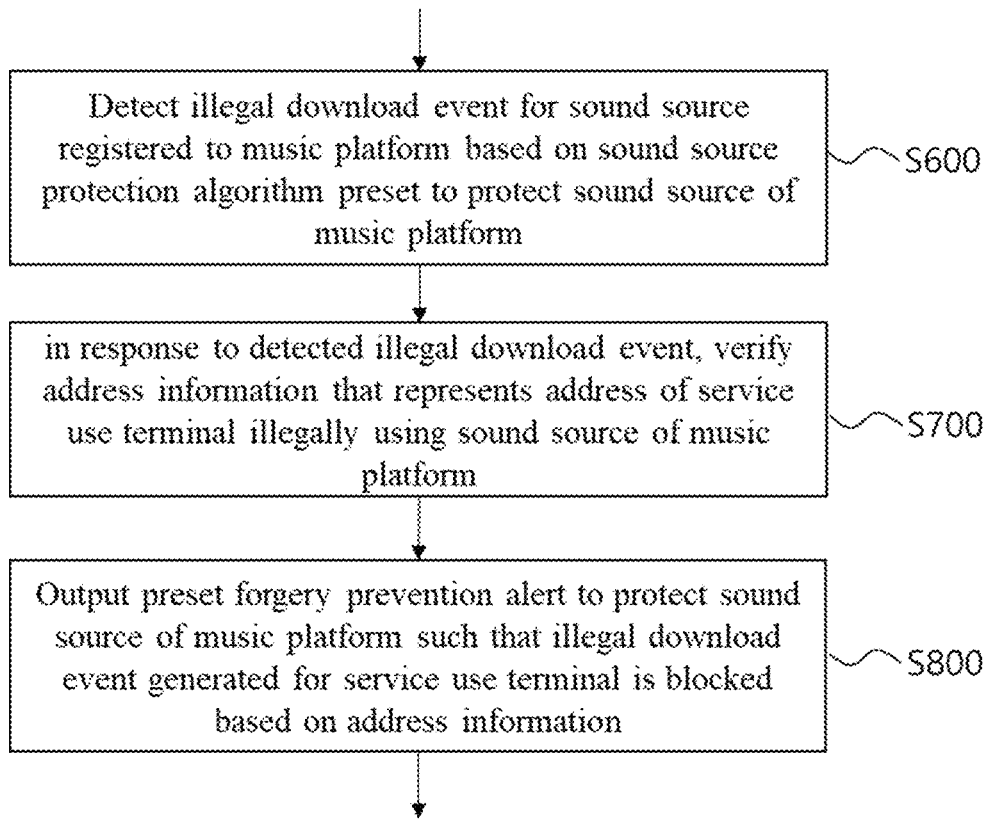

SERVICE PROVIDING METHOD PERFORMED BY SERVER OF MUSIC PLATFORM USING BLOCKCHAIN-BASED NFT

TECHNICAL FIELD

The present invention relates to a service providing method performed by a server of a music platform using a blockchain-based non-fungible token (NFT), and more particularly, to a service providing method that may provide a service related to a sound source in a music platform by issuing a blockchain-based NFT for the sound source.

RELATED ART

Currently, with the development of global music industry, platforms that support sound source-related services are emerging. Through such a platform, a right holder having a copyright for a corresponding sound source is securing revenues for the copyright of the sound source. However, in the case of the market related to music industry, the market is being operated mainly by large entertainment companies or distribution companies. Therefore, copyright fees (e.g., sound source fees) are being unequally distributed to the right holder having the copyright of the corresponding sound source.

Also, a blockchain-based non-fungible token (NFT) is being concentrated as technology that may clearly guarantee ownership for assets with authorization of ownership such as copyright. The NFT may refer to new digital assetization-related technology that assigns a unique digital certificate to an asset using blockchain-based encryption technology.

As such, the blockchain-based NFT that may clearly guarantee ownership for assets, such as copyright, and may support a direct transaction for various users is expected to apply to the music industry. However, there are not many or almost no services that support a music platform using a blockchain-based NFT or a sound source-related service so far.

DETAILED DESCRIPTION

Technical Subject

An objective of the present invention to solve the aforementioned issues is to provide a service providing method that provides a sound source-related service in a music platform by issuing a blockchain-based non-fungible token (NFT) for sound source.

Solution

A service providing method provided from a server of a music platform using a blockchain-based non-fungible token (NFT) according to an example embodiment to achieve the objective includes receiving sound source information on a sound source to be registered to the music platform and issuing a blockchain-based NFT that represents an ownership for the sound source; receiving a request for using a service related to the sound source registered to the music platform from at least one service use terminal connected to the blockchain-based network; and in response to the received request, providing a service related to the sound source based on the blockchain-based NFT issued in advance for the sound source to the at least one service use terminal.

Here, the issuing of the blockchain-based NFT may include issuing the blockchain-based NFT for the sound source to have a type of a unique token used in the blockchain-based network by matching copyright information of the sound source information and ownership information; generating a smart contract including a plurality of service codes related to the service of the music platform based on the sound source information on the sound source registered to the music platform; and supporting the at least one service use terminal to use a service corresponding to the plurality of service codes included in the smart contract as the service related to the sound source within the music platform.

Here, the plurality of service codes may include a first code related to a service for authorizing a copyright for the sound source corresponding to the sound source information by authorizing an ownership for the sound source information; a second code related to a service for authorizing identity of a right holder that holds the copyright for the sound source; a third code related to a service of a reward generated in response to use of the service related to the sound source in the music platform; and a fourth code related to a service that guarantees stability of the service related to the sound source generated in the music platform.

Here, the service providing method may further include issuing a blockchain-based cryptocurrency used as a method of transaction corresponding to the service related to the sound source in the music platform using the blockchain-based NFT; and in response to a request from at least one service use terminal connected to the blockchain-based network based on the issued cryptocurrency, providing the service related to the sound source registered in advance to the music platform.

Here, the service providing method may further include detecting an illegal download event for the sound source registered to the music platform based on a sound source protection algorithm preset to protect the sound source of the music platform; in response to the detected illegal download event, verifying address information that represents an address of a service use terminal illegally using the sound source of the music platform; and outputting a preset forgery prevention alert to protect the sound source of the music platform such that the illegal download event generated for the service use terminal is blocked based on the address information.

A method of detecting forgery of an NFT performed in a server of a platform using a blockchain-based NFT according to an example embodiment to achieve the other objective refers to a forger detection method of detecting forgery of an NFT performed in a server of a platform using a blockchain-based NFT and includes obtaining object information that represents information on an object requesting the platform for registration and extracting transaction information and ownership information included in the object information through analysis of the object information; generating detection information that includes a unique identification value used to detect forgery of the NFT issued for the object based on the transaction information and the ownership information; encrypting the generated detection information including the unique identification value, the transaction information, and the ownership information based on an encryption method used in the blockchain-based network; issuing the blockchain-based NFT for the object to include the detection information, the transaction information and the ownership information on the object that are encrypted based on the encryption method; and registering the blockchain-based NFT issued for the object to the platform and detecting forgery in response to a request for verifying whether the NFT for the object is forged.

Here, the transaction information may include information on a number of transactions generated through the object verified from the object information, information on a date of the generated transaction, and information on an amount of each transaction in which the object is transacted.

Here, the ownership information may include information on an owner that owns the object verified from the object information at a current point in time and information on a date on which ownership of the owner is registered.

Here, the generating of the detection information may include calculating, as a transaction identification value, a sum of a sum of the number of times, an average of a preset digit number among a plurality of numbers included in the date, and an average of a preset digit number among a plurality of numbers included in the amount; calculating, as an ownership identification value, a sum of an average of a preset digit number among a plurality of numbers included in a serial number preset for identifying the owner on the platform and an average of a preset digit number among a plurality of numbers included in the registered date; calculating the unique identification value by applying a calculation algorithm preset to calculate the unique identification value to the transaction identification value and the ownership identification value; and generating detection information used on the platform to detect the forgery of the NFT issued for the object through setting of including the calculated unique identification value.

Here, the detecting of the forgery may include receiving a forgery status verification request event including NFT information to request the platform to verify whether an NFT that is one of a plurality of pre-registered NFTs is forged; calculating a comparison target identification value based on transaction information and ownership information of an object related to an NFT to be verified through decryption with respect to the NFT to be verified for which the verification is requested; and detecting whether the NFT to be verified is forged based on a result of comparison between the calculated comparison identification value and the unique identification value included in the detection information.

Effects

According to the present invention, by registering a sound source created by various right holders to a music platform and issuing a blockchain-based NFT, it is possible to clearly guarantee ownership and copyright for the corresponding sound source and to easily use a sound source-related service.

Also, a service providing method according to the present invention may protect rights of a right holder by preventing illegal leakage or download of a sound source using a blockchain-based NFT to protect ownership and copyright for the sound source.

BRIEF DESCRIPTION OF DRAWINGS

FIG. 1 illustrates a structure of a music platform using a blockchain-based non-fungible token (NFT) according to an example embodiment.

FIG. 2 illustrates a smart contract of a music platform using a blockchain-based NFT according to an example embodiment.

FIG. 3 illustrates a process of issuing an NFT for sound source information in a music platform using a blockchain-based NFT according to an example embodiment.

FIG. 4 illustrates an operation of a music platform using a blockchain-based NFT according to an example embodiment.

FIG. 5 illustrates a service of a reward provided from a music platform using a blockchain-based NFT according to an example embodiment.

FIG. 6 illustrates a structure of registering sound source information to a music platform using a blockchain-based NFT according to an example embodiment.

FIG. 7 illustrates an environment of a service providing method performed by a server of a music platform using a blockchain-based NFT according to an example embodiment.

FIG. 8 is a hardware block diagram illustrating a server of a music platform using a blockchain-based NFT according to an example embodiment.

FIG. 9 is a flowchart illustrating a service providing method performed by a server of a music platform using a blockchain-based NFT according to an example embodiment.

FIG. 10 is a flowchart illustrating a method of issuing an NFT in a music platform using a blockchain-based NFT according to an example embodiment.

FIG. 11 is a flowchart illustrating a method of providing a sound source-related service in a music platform using a blockchain-based NFT according to an example embodiment.

FIG. 12 is a flowchart illustrating a method of protecting sound source information in a music platform using a blockchain-based NFT according to an example embodiment.

BEST MODE

Various modifications and various example embodiments may be made to the present invention and specific example embodiments are illustrated in the drawings and described in detail in the detailed description. Here, the example embodiments are not construed as limited to the present invention and should be understood to include all changes, equivalents, and replacements within the idea and the technical scope of the present invention. Here, like reference numerals refer to like elements throughout in describing the respective drawings.

Although terms of "first," "second," "A," "B," and the like are used to explain various components, the components are not limited to such terms. These terms are used only to distinguish one component from another component. For example, a first component may be referred to as a second component, or similarly, the second component may be referred to as the first component within the scope of the present disclosure. The term "and/or" includes any one and any combination of any two or more of the associated listed items.

When it is mentioned that one component is "connected" or "accessed" to another component, it may be understood that the one component is directly connected or accessed to another component or that still other component is interposed between the two components. In addition, it should be noted that if it is described in the specification that one component is "directly connected" or "directly joined" to another component, still other component may not be present therebetween.

The terminology used herein is for the purpose of describing particular example embodiments only and is not to be limiting of the present invention. As used herein, the singular forms "a," "an," and "the" are intended to include the plural forms as well, unless the context clearly indicates otherwise. It will be further understood that the terms "comprises" or "comprising," when used in this specification, specify the presence of stated features, integers, steps, operations, elements, components or a combination thereof, but do not preclude the presence or addition of one or more other features, integers, steps, operations, elements, components, or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings.

FIG. 1 illustrates a structure of a music platform using a blockchain-based non-fungible token (NFT) according to an example embodiment.

Referring to FIG. 1, the music platform using the blockchain-based NFT according to an example embodiment may basically have a structure of a decentralized platform through a blockchain-based network, for example, a blockchain-based token (e.g., also referrable to as 'KOONG TOKEN' herein in FIG. 1).

In particular, the music platform using the blockchain-based NFT according to an example embodiment may be operated in the blockchain-based network, and a sound source-related service may be provided to a user (, which may represent a "consumer" in FIG. 1) based on a plurality of codes related to a service provided from the music platform.

Also, in the music platform, a creator of the sound source (e.g., a copyright holder or a right holder) may have duty and right to register sound source information that is information on his/her own sound source to the music platform, and may receive a blockchain-based token (e.g., blockchain-based token 'KOONG TOKEN', etc., issued from the music platform) from the music platform as a reward for registering the sound source information to the music platform.

Meanwhile, a consumer using the sound source-related service through the music platform may have the right and duty to use the service related to sound source registered to the music platform and may provide the blockchain-based token (e.g., the blockchain-based token 'KOONG TOKEN' issued from the music platform) to the music platform in exchange for using the sound source-related service.

In this manner, the music platform may generate a blockchain-based smart contract in a relationship between the music platform and the creator and a relationship between the music platform and the consumer, which may represent a procedure for storing or managing information that may be generated in a process of using the sound source-related service through the music platform.

FIG. 2 illustrates a smart contract of a music platform using a blockchain-based NFT according to an example embodiment.

Referring to FIG. 2, the music platform using the blockchain-based NFT according to an example embodiment may operate by storing information in a distributed form in a blockchain-based network based on an InterPlanetary File System (IPFS) and by sharing the information over the Internet. In particular, the IPFS may support information through the smart contract for a user of the music platform, such as the creator and the consumer, in the blockchain-based network.

Also, the IPFS may be configured based on a P2P manner between the same layers. When information is registered to the blockchain-based network based on the IPFS, the IPFS may operate such that the registered information may be stored in a distributed form in the blockchain-based network.

A user connected to an IPFS-based network may manage corresponding information by distributing and owning chunk type information that is distributed information. When a request for a service related to the corresponding information occurs, the IPFS may respond to a request for a service based on the chunk type information that is the distributed information.

Meanwhile, when sound source information that is information on a sound source created or produced by a creator is registered, the music platform using the blockchain-based NFT according to an example embodiment may generate a hash code (or a hash value) for sound source information of the corresponding sound source and may store the generated hash code in the blockchain-based network as a hash code for the corresponding sound source information.

FIG. 3 illustrates a process of issuing an NFT for sound source information in a music platform using a blockchain-based NFT according to an example embodiment.

Referring to FIG. 3, a server of the music platform using the blockchain-based NFT according to an example embodiment may issue an NFT (e.g., also referrable to as 'KOONG NFT' herein) that is a blockchain-based token representing ownership and copyright for the sound source registered to the music platform. In detail, FIG. 3 illustrates a process of proceeding with a service related to 'KOONG NFT' in the music platform using the blockchain-based NFT according to an example embodiment.

Initially, in response to a user (e.g., a creator, etc.) that requests registration of a sound source representing the music platform of the present invention, the server of the music platform using the blockchain-based NFT according to an example embodiment may support membership signup of 'KOONG PLATFORM' for the corresponding user and, through this, may generate an account that the user may use in the music platform.

Then, the server of the music platform may generate a blockchain-based information storage medium linked to the account generated for the user in the music platform, which may refer to a medium that stores information, such as history generated in a process in which the user uses a sound source-related service in the music platform. Such an information storage medium may also be referred to as 'NOAH WALLET' in the music platform of the present invention.

Then, the server of the music platform may request a device of the user to register, to the music platform, sound source information that is information on a sound source of which registration is requested to the music platform. Here, the user that requests registration of the sound source may additionally register a name, description, profile, and a banner image of the sound source through the device of the user.

Then, the server of the music platform may register sound source information that is information on the sound source to the music platform using the blockchain-based NFT and may generate the blockchain-based NFT that represents ownership and copyright for the sound source. Here, the server of the music platform may inform that the blockchain-based NFT for the corresponding sound source is issued by transmitting information on the blockchain-based NFT issued for the sound source to the device of the user.

Then, the server of the music platform may register the corresponding sound source to the music platform based on the issued NFT and may support at least one user connected to the blockchain-based network to use a service related to the corresponding sound source. Here, the server of the music platform may support a creator that is a user having created the corresponding sound source to set price and sales method for the sound source.

Then, the server of the music platform may operate such that the service related to the sound source may be provided based on the NFT issued in advance for the corresponding sound source in a process in which the user connected to the blockchain-based network uses the service related to the corresponding sound source. For example, the server of the music platform may provide a blockchain-based cryptocurrency issued from the music platform to the creator that registers the sound source to the music platform and the user using the service related to the sound source may use the service related to the sound source by paying a corresponding cryptocurrency.

FIG. 4 illustrates an operation of a music platform using a blockchain-based NFT according to an example embodiment.

Referring to FIG. 4, an example of a procedure of performing a service providing method by a server of the music platform using the blockchain-based NFT according to an example embodiment will be sequentially described. In detail, a procedure from a process of registering a sound source to the music platform to a process of purchasing the sound source through a service related to the sound source will be explained.

Initially, a creator that creates a sound source may create "A sound source" and may register the created "A sound source" to the music platform using the blockchain-based NFT according to an example embodiment. Here, the creator may input meta data that may mean overall information related to the sound source in a process of requesting registration of the sound source to the music platform.

Then, when at least one user connected to the blockchain-based network uses a download service and a streaming service that is a service related to the sound source registered to the music platform, the server of the music platform may operate such that at least one user may pay a usage fee, i.e., cost for using the service related to the sound source.

Then, the server of the music platform may store use details information (e.g., sound source information that is information on a sound source used for a transaction and payment information) for the user that uses the service related to the sound source registered to the music platform and manage use history of the service related to the sound source for the corresponding user.

Here, when at least one user connected to the blockchain-based network uses the service related to the sound source registered to the music platform, it is possible to verify use details or payment information of the service related to the sound source based on information that is prestored on a blockchain-based smart contract generated for the corresponding user.

Then, the server of the music platform may charge the user using the service related to the sound source among one or more users connected to the blockchain-based network for a fee for using the service related to the corresponding sound source based on a settlement method preset by the creator that registers the sound source and may settle the cost of the service related to the sound source to the creator based on the charged details.

FIG. 5 illustrates a service of a reward provided from a music platform using a blockchain-based NFT according to an example embodiment.

Referring to FIG. 5, the music platform using the blockchain-based NFT according to an example embodiment may issue a blockchain-based cryptocurrency available in the music platform and may support a service related to a sound source for a creator of the corresponding sound source and a consumer that uses the service related to the sound source, based on the issued cryptocurrency Initially, at least one user connected to the blockchain-based network may proceed with a membership registration in the music platform to use the service related to the sound source registered to the music platform and, in response thereto, an information storage medium (e.g., referrable to as 'KOONG WALLET' herein) available in the music platform may be assigned to the corresponding at least one user.

Then, the server of the music platform may provide a point (e.g., referrable to as 'KOONG POINT' herein) available in the music platform to at least one user using the service related to the sound source, such as purchasing the sound source registered to the music platform. Also, in the case of writing a review, such as a comment, for the sound source registered to the music platform, the server of the music platform may provide a point available in the music platform to corresponding at least one user as a reward for the review.

Here, the point available in the music platform may be provided to be stored in the information storage medium generated in advance for at least one user and may be exchanged with the blockchain-based cryptocurrency issued from the music platform or may be used as a transaction method in a process of using the service related to the sound source. As described above, the blockchain-based cryptocurrency used in the music platform may be traded using exchange in an exchange in which cryptocurrencies are traded.

Meanwhile, the server of the music platform may generate information on reviews, such as comments, on use details of the service related to the sound source generated by at least one user and the sound source, as bigdata and, through this, may generate an additional service (e.g., a sound source recommendation service based on use details of the user for the sound source-related service) related to sound sources provided from the music platform.

FIG. 6 illustrates a structure of registering sound source information to a music platform using a blockchain-based NFT according to an example embodiment.

Referring to FIG. 6, a server of the music platform using the blockchain-based NFT according to an example embodiment may perform a procedure of a smart contract as a procedure for registering a sound source, and may generate unique identification information (e.g., information such as an ID) on the corresponding sound source in a process of registering the sound source.

Here, the server of the music platform may store only information related to a transaction of the sound source in a smart contract for the sound source and other information, such as meta data, that may indicate overall information on the sound source may be separately stored and managed.

Also, the server of the music platform may store only a hash code in the meta data related to the sound source in the blockchain-based network and other meta data for the sound source may be separately stored in an independent storage space, such as a server in on-premise server, and thereby managed.

In detail, referring to FIG. 6, the server of the music platform may generate 'MUSIC META DATA' indicating meta data that is overall information on the sound source, as a unique value (e.g., which may indicate a hash code) available in the blockchain-based network based on a cryptographic hash module, in a process of registering sound source information that is information on the sound source to the music platform and, through this, may register the sound source to the blockchain-based network.

Here, the server of the music platform may issue information on a block number, a number of block transmissions, and transmission contents for the sound source to be included in the blockchain-based NFT that is issued for the sound source and, through this, may register sound source information that is information on the sound source to the music platform using the blockchain-based NFT.

Meanwhile, the music platform using the blockchain-based NFT according to an example embodiment described with reference to FIGS. 1 to 6 may schematically explain a process of providing a sound source-related service in the music platform or an operation of the music platform.

Hereinafter, a service providing method performed by the server of the music platform using the blockchain-based NFT according to an example embodiment described above with reference to FIGS. 1 to 6 will be explained in more detail with reference to FIGS. 7 to 12, which may correspond to the contents described above with reference to FIGS. 1 to 6 and may also be said to be performed in a similar or identical environment.

FIG. 7 illustrates an environment of a service providing method performed by a server of a music platform using a blockchain-based NFT according to an example embodiment.

Referring to FIG. 7, the service providing method performed by the server of the music platform using the blockchain-based NFT according to an example embodiment may be performed by a server 100 of a platform using the blockchain-based NFT and a device 200 (e.g., which may indicate a 'service use terminal' that is a device of at least one user using a service related to sound source registered to the music platform using the blockchain-based NFT) of at least one user connected to the blockchain-based network.

In detail, the server 100 of the music platform using the blockchain-based NFT may represent the server of the music platform using the blockchain-based NFT described above with reference to FIGS. 1 to 6, and may represent a device, such as a server of a provider that runs or manages the music platform.

Also, the device 200 of at least one user connected to the blockchain-based network may represent a 'service use terminal' that is a device of at least one user using a service related to corresponding sound source provided from the server of the music platform using the blockchain-based NFT described above with reference to FIGS. 1 to 6, and more particularly, may represent a device of a creator having created sound source or a device of a consumer using the service related to the sound source, such as downloading the sound source registered to the music platform.

Referring to FIG. 7, the server 100 of the music platform using the blockchain-based NFT and the device 200 of at least one user connected to the blockchain-based network may transmit or receive information required to provide or use the sound source-related service from the server 100 of the music platform using the blockchain-based NFT.

That is, the server 100 of the music platform using the blockchain-based NFT and the device 200 of at least one user connected to the blockchain-based network of FIG. 7 may be interlocked or connected in advance for mutual communication through the blockchain-based network to transmit or receive information required to provide or use the sound source-related service provided from the server 100 of the music platform using the blockchain-based NFT.

FIG. 8 is a hardware block diagram illustrating a server of a music platform using a blockchain-based NFT according to an example embodiment.

Referring to FIG. 8, a server 300 of a music platform using a blockchain-based NFT may refer to the server of the music platform using the blockchain-based NFT of FIG. 1 and the server 100 of the music platform using the blockchain-based NFT of FIG. 2. Hardware components described with reference to the server 100 of the music platform may not be limited to the server of the music platform.

That is, although description is made using the server of the music platform as an example in FIG. 8, the hardware structure of FIG. 8 may apply similarly or equally to the device 200 of at least one user connected to the blockchain-based network of FIG. 7.

The server 300 of the music platform using the blockchain-based NFT according to an example embodiment may include at least one processor 310 and memory 320 configured to store instructions for instructing at least one processor to perform at least one operation.

Here, the at least one processor 310 may refer to a central processing unit (CPU), a graphics processing unit (GPU), or a dedicated processor on which methods according to example embodiments are performed. Each of the memory 320 and a storage device 360 may be configured as at least one of a volatile storage medium and a non-volatile storage medium. For example, the memory 320 may be configured as at least one of read only memory (ROM) and random access memory (RAM).

Also, the server 300 of the music platform using the blockchain-based NFT may include a transceiver 330 configured to perform communication through a wireless network. Also, the server 300 of the music platform using the blockchain-based NFT may further include an input interface device 340, an output interface device 350, and the storage device 360. Each of components included in the server 300 of the music platform using the blockchain-based NFT may be connected through a bus 370 and may perform mutual communication.

Here, at least one operation may refer to an operation related to a service providing method provided from a server of a music platform using a blockchain-based NFT according to an example embodiment, and more particularly, to an operation related to an operation method performed by the server 300 of the music platform using the blockchain-based NFT.

Hereinafter, a detailed process of performing the service providing method by the server of the music platform using the blockchain-based NFT according to an example embodiment in a device (e.g., a service use terminal, etc.) of at least one user connected to the server of the music platform using the blockchain-based NFT and the blockchain-based network, described with reference to FIGS. 1 to 8, will be further described with reference to FIGS. 9 to 12.

FIG. 9 is a flowchart illustrating a service providing method performed by a server of a music platform using a blockchain-based NFT according to an example embodiment.

Referring to FIG. 9, the service providing method of the server of the music platform using the blockchain-based NFT according to an example embodiment may be performed by the server of the music platform using the blockchain-based NFT and the device (e.g., a service use terminal, etc.) of at least one user connected to the blockchain-based network, described above with reference to FIGS. 1 to 8.

Initially, the server of the music platform may receive sound source information on a sound source to be registered to the music platform and may issue a blockchain-based NFT that represents an ownership for the sound source (S100).

Here, a method of receiving, by the server of the music platform, sound source information on a sound source to be registered to the music platform and issuing a blockchain-based NFT that represents an ownership of the sound source is further described below with reference to FIG. 10.

FIG. 10 is a flowchart illustrating a method of issuing an NFT in a music platform using a blockchain-based NFT according to an example embodiment.

Referring to FIG. 10, the server of the music platform using the blockchain-based NFT according to an example embodiment may issue the blockchain-based NFT for the sound source to have a type of a unique token used in the blockchain-based network by matching copyright information and ownership information of the sound source information (S110).

In detail, the blockchain-based NFT issued from the server of the music platform using the blockchain-based NFT according to an example embodiment may be referred to as 'KOONG NFT TOKEN' and may serve as a "digital certificate" by Ethereum-based Ethereum Request for Comment (ERC)-721.

As described above, the blockchain-based NFT issued for the sound source from the server of the music platform may be stored in the blockchain-based network in a structure of a decentralized platform and may play a role in dividing the existing right of a specific user centralized for the sound source.

For example, a process of issuing, by the server of the music platform using the blockchain-based NFT, the blockchain-based NFT for the sound source is similar or identical to the description of FIG. 3.

In particular, the server of the music platform may essentially verify copyright information and ownership information on corresponding sound source based on sound source information that is information on the sound source registered by a creator of the sound source with respect to the sound source and may issue the blockchain-based NFT for the sound source such that the verified copyright information and ownership information may be included.

Then, the server of the music platform may generate a smart contract including a plurality of service codes related to a service of the music platform based on the sound source information on the sound source registered to the music platform (S120).

In detail, the plurality of service codes included in the smart contract may include a first code related to a service for authorizing a copyright for the sound source corresponding to the sound source information by authorizing an ownership for the sound source information, a second code related to a service for authorizing identity of a right holder that holds the copyright for the sound source, a third code related to a service of a reward generated in response to use of the service related to the sound source in the music platform, and a fourth code related to a service that guarantees stability of the service related to the sound source generated in the music platform.

For example, the first code related to the service for authorizing the copyright may be referred to as a "copyright contract code" and may represent a code related to a service executable for a user that completes a Know Your Customer (KYC) authentication process. Here, an identity authentication procedure may be performed by the server of the music platform using the blockchain-based NFT according to an example embodiment.

Also, the first code related to the service for authorizing the copyright among the plurality of service codes included in the smart contract may aim to provide a digital license solution for a reward-related service and may also represent a payment-related method providable to a user using the sound source-related service provided from the music platform.

Also, the second code related to the service for authorizing the identity may represent that, when a user of which the KYC authentication procedure is first completed once joins the music platform, information of the corresponding user is registered, which is described above with reference to the first code. Here, information of the registered user may also be generated with the smart contract and may be managed based on a separate authentication medium on the music platform. Also, information of the corresponding user may be used for the music platform and a P2P-related service.

Also, the third code related to the service of the reward may represent providing a blockchain-based cryptocurrency issued from the music platform as a reward to at least one user using a service related to sound source registered to the music platform and connected to the blockchain-based network. The blockchain-based cryptocurrency may be used as a gift for another user using the service related to the sound source registered to the music platform and connected to the blockchain-based network.

Also, the fourth code related to the service that guarantees the stability may represent real-time monitoring transaction-related information for security, trust-based transparency, transaction, and fraud payment prevention, with respect to at least one user using the sound source-related service provided from the music platform.

Meanwhile, the smart contract generated in the server of the music platform and the plurality of service codes included in the smart contract may be similar or identical to the description of FIGS. 1 and 2.

Then, the server of the music platform may support the at least one service use terminal to use a service corresponding to the plurality of service codes included in the smart contract as the service related to the sound source within the music platform (S130).

In detail, as described above with reference to operation S120, the server of the music platform may provide the service corresponding to the plurality of service codes, for example, the sound source-related service, to at least one service use terminal within the music platform. For example, the server of the music platform may provide a blockchain-based cryptocurrency issued from the server of the music platform as a reward for sound source information registered to correspond to the third code, to a creator that connects to the blockchain-based network, creates a sound source, and registers the sound source information, information on the sound source, in the sound source-related service provided from the server of the music platform.

That is, referring to FIG. 9, the server of the music platform using the blockchain-based NFT according to an example embodiment may receive a request for using a service related to the sound source registered to the music platform from at least one at least one service use terminal connected to the blockchain-based network (S200).

Initially, at least one user among a plurality of users connected to the blockchain-based network may request the server of the music platform for using the sound source-related service provided from the music platform. In response thereto, the server of the music platform may receive the request for using the sound source-related service provided from the music platform from the at least one user among the plurality of users connected to the blockchain-based network.

For example, the at least one user may connect to the music platform through the service use terminal that is a device of the at least one user and may request downloading of at least one sound source among a plurality of sound sources registered in advance to the music platform. Then, the server of the music platform may detect a download request for one of the plurality of sound sources registered to the music platform from the service use terminal.

Then, in response to the received request, the server of the music platform may provide a service related to the sound source based on the blockchain-based NFT issued in advance for the sound source to the at least one service use terminal (S300).

In detail, the server of the music platform may verify the previously issued blockchain-based NFT for the sound source for which a service use request is received from the service use terminal. Then, the server of the music platform may verify copyright information and ownership information on the corresponding sound source based on the verified blockchain-based NFT for the corresponding sound source.

Then, the server of the music platform may verify a settlement method for the sound source registered in advance by the creator having created the corresponding sound source based on the verified copyright information and ownership information, and may charge the service use terminal for a fee for using the service related to the corresponding sound source based on the verified settlement method.

Then, when it is determined that processing of the charged fee is completed by the service use terminal, the server of the music platform may provide the service related to the corresponding sound source to the service use terminal. Here, the server of the music platform may additionally store use details of the service related to the corresponding sound source in the sound source information that is information on the corresponding sound source and the blockchain-based NFT for the corresponding sound source.

Here, the server of the music platform using the blockchain-based NFT according to an example embodiment may issue the blockchain-based cryptocurrency available in a process of providing the sound source-related service from the music platform. In detail, a method of issuing the blockchain-based cryptocurrency from the music platform server will be further described with reference to FIG. 11.

FIG. 11 is a flowchart illustrating a method of providing a sound source-related service in a music platform using a blockchain-based NFT according to an example embodiment.

Referring to FIG. 11, a server of the music platform using the blockchain-based NFT according to an example embodiment may issue a blockchain-based cryptocurrency used as a method of transaction corresponding to the sound source-related service in the music platform using the blockchain-based NFT (S400).

In detail, the blockchain-based cryptocurrency issued from the server of the music platform herein may be referred to as 'KOONG TOKEN' and may be an ERC-20-based token, and may play a role of a fee payment for an NFT issuance, a payment method for using the sound source-related service, and a key currency paid as revenues to the creator having the copyright, in the music platform.

Then, in response to a request from at least one service use terminal connected to the blockchain-based network based on the issued cryptocurrency, the server of the music platform may provide the service related to the sound source registered in advance to the music platform.

Here, a detailed method of providing, by the server of the music platform, the service related to the sound source registered in advance to the music platform in response to the request from the at least one service use terminal connected to the blockchain-based network based on the blockchain-based cryptocurrency may be similar or identical to the description made above with reference to FIGS. 4 and 5.

For example, when at least one service use terminal connected to the blockchain-based network uses the sound source-related service, the server of the music platform may charge the at least one service use terminal based on a unit of the blockchain-based cryptocurrency as a fee for using the sound source-related service. Also, when a creator having created a sound source registers sound source information that is information on the sound source to the music platform, the server of the music platform may provide the blockchain-based cryptocurrency as a reward for registering the sound source information.

Meanwhile, the server of the music platform using the blockchain-based NFT according to an example embodiment may operate a policy for protecting the sound source registered to the music platform and a further description related thereto will be made with reference to FIG. 12.

FIG. 12 is a flowchart illustrating a method of protecting sound source information in a music platform using a blockchain-based NFT according to an example embodiment.

Referring to FIG. 12, a server of the music platform using the blockchain-based NFT according to an example embodiment may detect an illegal download event for the sound source registered to the music platform based on a sound source protection algorithm preset to protect the sound source of the music platform (S600).

In detail, to detect the illegal download event for the sound source, the server of the music platform may monitor an event related to the NFT for the sound source stored in the blockchain-based network with respect to the sound source registered to the music platform. Here, when it is determined that the event related to the NFT has occurred, the server of the music platform may verify legitimacy of the corresponding event.

For example, when the event related to the NFT for the sound source is a download event for the corresponding sound source, the server of the music platform may verify whether a payment suitable for downloading of the corresponding sound source is processed. When the payment for the corresponding sound source is not processed, the server of the music platform may detect that the download event for the corresponding sound source is an illegal download event.

In response to the detected illegal download event, the server of the music platform may verify address information that represents an address of a service use terminal illegally using the sound source of the music platform (S700).

That is, the server of the music platform may verify the address information representing the address of the service use terminal that is a device of a user illegally using the sound source of the music platform, from at least one user connected to the blockchain network. This may refer to a procedure for verifying a service use terminal that generates the illegal download event for the sound source. For example, the address of the service use terminal may be an IP address or an address of the service use terminal used in the blockchain-based network.

Then, the server of the music platform may output a preset forgery prevention alert to protect the sound source of the music platform such that the illegal download event generated for the service use terminal is blocked based on the address information (S800).

Here, when it is determined that the sound source is being output from the service use terminal, the server of the music platform may control the corresponding sound source to not be output and may control not the corresponding sound source but the preset forgery prevention alert to be output in order to protect the sound source in the music platform.

Here, when it is impossible to control the sound source to not be output from the corresponding service use terminal, the server of the music platform may control the forgery prevention alert to be output with the corresponding sound source and, through this, may prevent the service use terminal illegally using the sound source from using the sound source in a normal manner. The forgery prevention alert may be a specific sound source having a predetermined playtime (e.g., about 5 seconds to 5 minutes) and may be repeatedly played back while the sound source is illegally used.

Then, when it is determined that a payment is performed by the service use terminal in exchange for using the service related to the corresponding sound source, the server of the music platform may control the forgery prevention alert being output to not be output and, through this, may support a normal use of the sound source registered to the music platform.

Meanwhile, the server of the music platform using the blockchain-based NFT according to an example embodiment may be linked with a cloud server in advance and may manage use details of an NFT for the sound source registered to the music platform by country based on the linked cloud server.

That is, the server of the music platform may share the NFT issued for the sound source registered to the music platform with the cloud server and may support use of the service related to the sound source based on the shared NFT.

Also, the server of the music platform may manage the use details of the service related to the sound source registered to the music platform by country by accumulating and storing the service use details generated by the cloud server.

Also, the service related to the sound source registered to the music platform, described above with reference to FIGS. 1 to 12 may be equally supported by country based on the cloud server. As described above, the server of the music platform may globally provide the service related to the sound source registered to the music platform.

The methods according to the present invention may be implemented in a form of program instructions executable through various computer methods and may be recorded in computer-readable recording media. The media may include, alone or in combination, program instructions, data files, data structures, etc. The program instructions recorded in the computer-readable recording media may be specially designed and configured for the present invention or may be known to those skilled in the computer software art and thereby available.

Examples of the media may include a hardware device specially configured to store and execute a program instruction, such as read only memory (ROM), random access memory (RAM), flash memory, etc. Examples of the program instruction may include a high-level language code executable by a computer using an interpreter as well as a machine language code such as one produced by a compiler. The hardware device may be configured to operate as at least one software module to perform an operation of the present invention, or vice versa.

Also, the methods or the apparatuses may be implemented through combination of or may be implemented through separation of all of or a portion of the components or functions.

Although the present invention is described with reference to the example embodiments, it will be apparent to those skilled in the art that various modifications and changes may be made to the present invention without departing from the spirit and scope of the present invention as disclosed in the claims.

| Explanation of Symbols |
| --- |
| 100: server of music platform |
| 200: device of at least one user |
| 300: server of music platform |
| 310: processor |
| 320: memory |
| 330: transceiver |
| 340: input interface device |
| 350: output interface device |
| 360: storage device |
| 370: bus |

What is claimed is:

1. A service providing method provided from a server of a music platform using a blockchain-based non-fungible token (NFT), the service providing method comprising:

issuing a blockchain-based NFT that represents an ownership for a sound source to have a type of a unique token used in a blockchain-based network by matching copyright information and ownership information of sound source information on the sound source to be registered to the music platform;

generating a smart contract including a plurality of service codes related to services of the music platform based on the sound source information on the sound source registered to the music platform;

receiving a request for using a service related to the sound source registered to the music platform from a service use terminal connected to the blockchain-based network;

in response to the received request, providing the service related to the sound source based on the blockchain-based NFT issued in advance for the sound source to the service use terminal;

detecting an illegal download event for the sound source registered to the music platform based on a sound source protection algorithm preset to protect the sound source of the music platform;

in response to the detected illegal download event, verifying address information that represents an address of the service use terminal illegally using the sound source of the music platform; and outputting a preset forgery prevention alert to protect the sound source of the music platform such that the illegal download event generated for the service use terminal is blocked based on the address information;

wherein the outputting the preset forgery prevention alert to protect the sound source of the music platform such that the illegal download event generated for the service use terminal is blocked based on the address information comprises:

in response to determining that the sound source is being output on the use terminal, controlling the sound source not to be output;

determining whether the sound source is not being output on the service use terminal;

in response to determining that it is impossible to control the sound source not to be output, outputting the preset forgery prevention alert along with the sound source;

while the forgery prevention alert is being output to the service use terminal, in response to determining that a payment is performed by the service use terminal in exchange for using the service related to the sound source, wherein the server of the music platform controls the forgery prevention alert being output to not be output;

in the process of checking whether the payment to be performed, wherein the server of the music platform verifies a settlement method for the sound source registered in advance by a creator having created the sound source, charges the service use terminal for a fee for using the service related to the sound source based on the verified settlement method, and additionally stores use details of the service related to the sound source in the blockchain-based NFT for the sound source of the service use terminal, wherein the plurality of service codes comprises:

a first code related to authorization of a copyright for the sound source corresponding to the sound source information by authorizing an ownership for the sound source information;

a second code related to authorization of an identity of a right holder that holds the copyright for the sound source;

a third code related to a reward generated in response to use of the service related to the sound source in the music platform; and a fourth code related to a guarantee of stability of the service related to the sound source generated in the music platform;

wherein the service providing method further comprises:

issuing a blockchain-based cryptocurrency used as a means of transaction corresponding to the service related to the sound source in the music platform using the blockchain-based NFT; and in response to the request from the service use terminal connected to the blockchain-based network, providing the service related to the sound source registered in advance to the music platform based on the issued cryptocurrency;

wherein the server of the music platform stores information related to a transaction of the sound source in the smart contract, wherein the server of the music platform stores only a hash code in meta data that indicates overall information on the sound source except for the information related to the transaction of the sound source in the blockchain-based network and other meta data for the sound source except for the hash code is separately stored in an on-premise server that is different from the server of the music platform, and wherein information of a user generated with the smart contract is additionally authenticated by using a separate authentication medium.

\* \* \* \* \*